United States Patent
Chang

(10) Patent No.: US 8,541,697 B2
(45) Date of Patent: Sep. 24, 2013

(54) DUSTPROOF STRUCTURE AND ELECTRONIC DEVICE EMPLOYING THE SAME

(75) Inventor: Chih-Wei Chang, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 351 days.

(21) Appl. No.: 13/031,710

(22) Filed: Feb. 22, 2011

(65) Prior Publication Data
US 2012/0081865 A1    Apr. 5, 2012

(51) Int. Cl.
*H05K 5/06* (2006.01)
*H04M 1/00* (2006.01)

(52) U.S. Cl.
USPC ................ 174/564; 455/575.8; 349/58

(58) Field of Classification Search
USPC .............. 174/564; 455/575.1, 575.8; 349/58
See application file for complete search history.

(56) References Cited

U.S. PATENT DOCUMENTS

| 7,519,350 | B2 * | 4/2009 | Yamamoto et al. | 455/347 |
| 7,920,225 | B2 * | 4/2011 | Nishikawa et al. | 349/60 |
| 8,060,168 | B2 * | 11/2011 | Horrdin et al. | 455/575.8 |
| 8,112,129 | B2 * | 2/2012 | Shinoda et al. | 455/575.1 |
| 2003/0194974 | A1 * | 10/2003 | Curtis et al. | 455/90.1 |
| 2008/0242384 | A1 * | 10/2008 | Hsu et al. | 455/575.8 |
| 2009/0054115 | A1 * | 2/2009 | Horrdin et al. | 455/575.8 |
| 2009/0247236 | A1 * | 10/2009 | Kajiwara et al. | 455/566 |
| 2012/0118628 | A1 * | 5/2012 | Pakula et al. | 174/520 |

* cited by examiner

*Primary Examiner* — Hung Ngo
(74) *Attorney, Agent, or Firm* — Altis Law Group, Inc.

(57) ABSTRACT

A dustproof structure is used in an electronic device, which includes a housing and a display panel. The dustproof structure includes a dustproof section and a first adhesive section. The dustproof section is located and received in the housing. The first adhesive section is fixed on the one side of the dustproof section, and the display panel is fixed on the dustproof structure by the first adhesive section and is assembled to the housing. The dustproof structure fills gaps between the housing and the display panel.

15 Claims, 4 Drawing Sheets

DUSTPROOF STRUCTURE AND ELECTRONIC DEVICE EMPLOYING THE SAME

BACKGROUND

1. Technical Field

The disclosure generally relates to dustproof structures, and more particularly relates to a dustproof structure and an electronic device using the dustproof structure.

2. Description of the Related Art

Electronic devices, such as mobile phones, personal digital assistants (PDAs), are now in widespread use. Consumers may enjoy the full convenience of the electronic devices almost anytime and anywhere. However, in daily use, displays of the electronic devices may be easily contaminated by dust or other impurities, which may be not easy to clean.

Therefore, there is room for improvement within the art.

BRIEF DESCRIPTION OF THE DRAWINGS

Many aspects of an embodiment of a dustproof structure and an electronic device employing the same can be better understood with reference to the following drawings. The components in the drawings are not necessarily drawn to scale, the emphasis instead being placed upon clearly illustrating the principles of the exemplary dustproof structure and electronic device employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
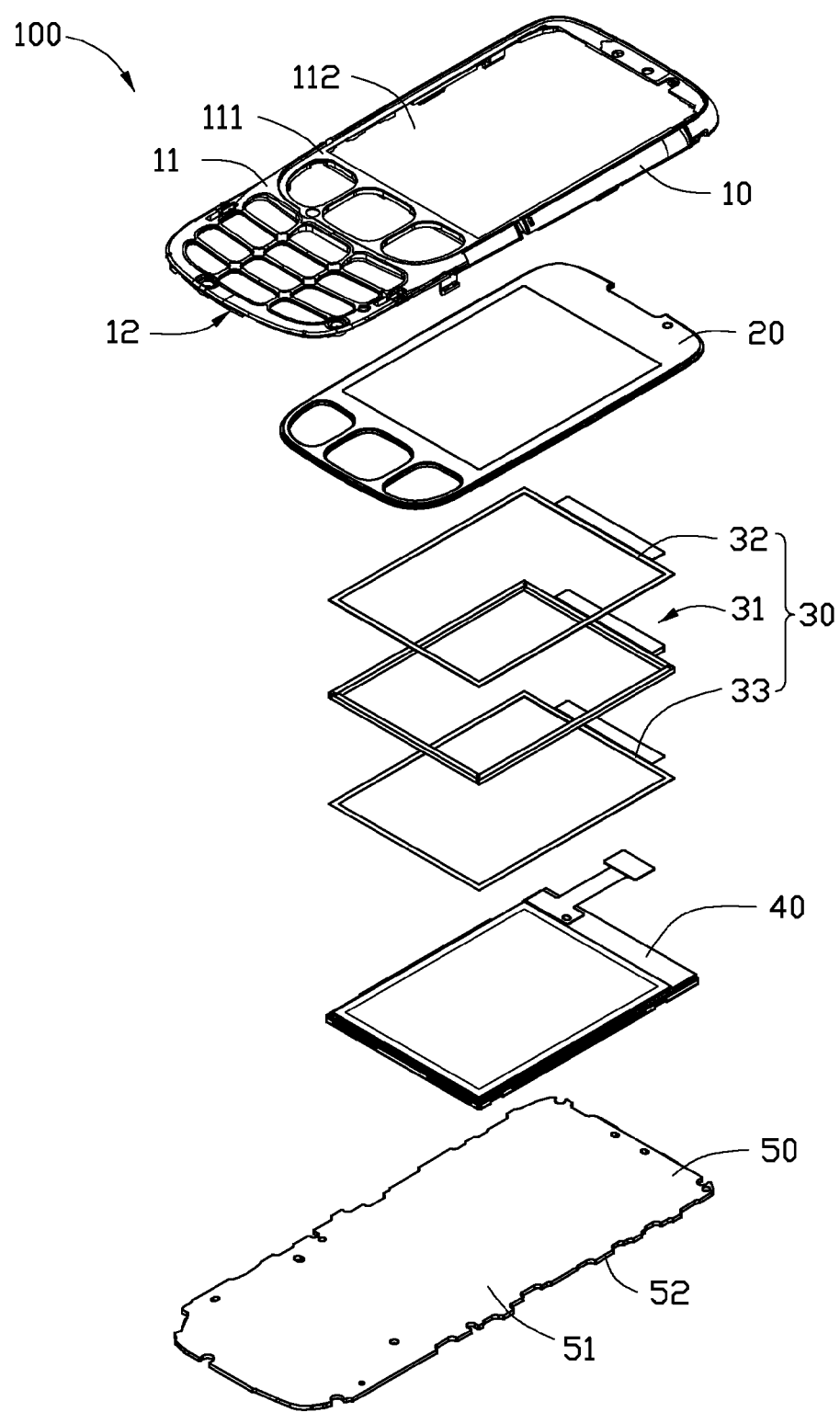
FIG. 1 is an exploded view of an electronic device, according to an exemplary embodiment.
Figure 2:
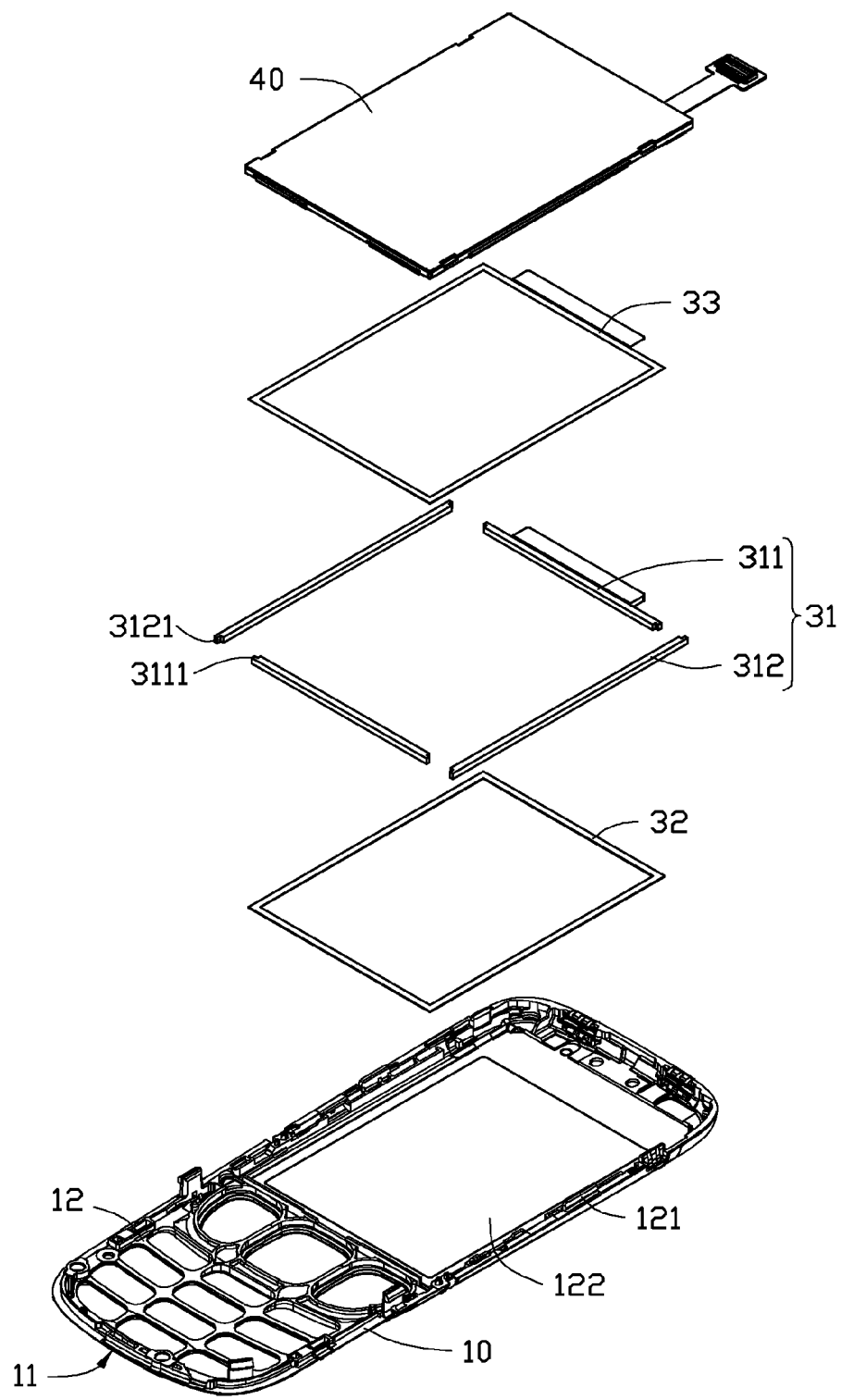
FIG. 2 is similar to FIG. 1, but partially exploded viewed from other aspect.

FIGS. 1 and 2 show an exemplary embodiment of an electronic device 100, which may be a personal digital assistant (PDA), or a mobile phone. The mobile phone is used here as an example, for the purpose of describing the details of the electronic device 100. The electronic device 100 includes a housing 10, a protective structure 20, a dustproof structure 30, a display panel 40, and a circuit board 50.

The housing 10 can be the front cover of the electronic device 100 and includes a first surface 11 and a second surface 12. The housing 10 further includes an assembling section 111 depressed from the first surface 11. The assembling section 111 defines an assembling hole 112, which is substantially rectangular and is located at the middle of the assembling section 111 and passes through the first surface 11 and the second surface 12.

Referring to FIG. 2, the second surface 12 includes a plurality of locking sections 121 at opposite sides of the second surface 12. Each locking section 121 is substantially rectangular sheets and is substantially perpendicularly to the second surface 12. The two locking sections 121 can be fixed on the second surface 12 by one-body formed, by hot staking, or by welding.

The protective structure 20 is substantially rectangular sheet and can be made from glass, polymethyl methacrylate (PMMA), or other transparent materials. The protective structure 20 is secured and received in the assembling section 111 and covers the assembling hole 112, forming a substantially rectangular receiving space 122 with the second surface 12. The protective structure 20 is capable of protecting the display panel 40, avoiding scratching, tearing, and damaging the display panel 40.

The dustproof structure 30 is located at and received in the receiving space 122 and includes a dustproof section 31, a first adhesive section 32, and a second adhesive section 33. The dustproof section 31 is substantially rectangular frame and can be made from foam. The dustproof section 31 includes two first dustproof strips 311 and two second dustproof strips 312. Each first dustproof strip 311 is substantially rectangular bar shape and includes two first engaging portions 3111 at the opposite ends of the first dustproof strip 311. Both the two first engaging portions 3111 are step-shaped. Each second dustproof strip 312 is substantially rectangular bar and includes two second engaging portions 3121 at the opposite ends of the second dustproof strip 312. Both the two second engaging portions 3121 are step-shaped.

In this exemplary embodiment, the first dustproof strips 311 are parallel to each other and are perpendicularly connected to the opposite ends of each second dustproof strip 312. Each first engaging portion 3111 of the first dustproof strip 311 is engaged to the corresponding second engaging portion 3121 of the second dustproof strip 312, forming the substantially rectangular dustproof section 31.

The two adhesive sections 32 and 33 are substantially rectangular frames, which have the substantially same size and shape as that of the dustproof section 31. The dustproof section 31 is located between the two adhesive sections 32 and 33. In detail, the surfaces of the two adhesive sections 32 and 33 are coated by viscose, adhesive, glue or other adhesive materials. Thus, the dustproof structure 30 is secured and is fixed to the receiving space 122 with the adhesive material on the first adhesive section 32; the display panel 40 is secured and is fixed on the dustproof structure 30 with the adhesive material on the second adhesive section 32. Thus, the protective structure 20 and the display panel 40 are assembled together through the dustproof structure 30 to eliminate assembled gaps between the protective structure 20 and the display panel 40, forming a closed dustproof space 41, so the dust or other impurities are prevented from getting into the dustproof space 41 to protect the display panel 40.

The display panel 40 can be a liquid crystal display (LCD) panel, which is installed between the circuit board 50 and the dustproof structure 30. The circuit board 50 can be a printed circuit board (PCB) and includes a base body 51 and a plurality of assembly sections 52 at opposite sides of the base body 51. The base body 51 is a substantially rectangular sheet and is assembled to the housing 10 to provide circuit connection for electronic elements including the display panel 40.

The assembly sections 52 are in the same plane with the base body 51 and protrude from the opposite sides of the base body 51. The assembly sections 52 are aligned and are engaged with the corresponding locking sections 121 to secure and assemble the circuit board 50 to the housing 40. Thus, the circuit board 50 secures the display panel 40 and provides circuit connections to the display panel 40.

The first adhesive section 32 received in the receiving space 122 can be omitted, so the second adhesive section 33 is used to secure and fix the display panel 40 to the dustproof structure 30, and the display panel 40 is further secured and fixed by the circuit board 50.

Figure 3:
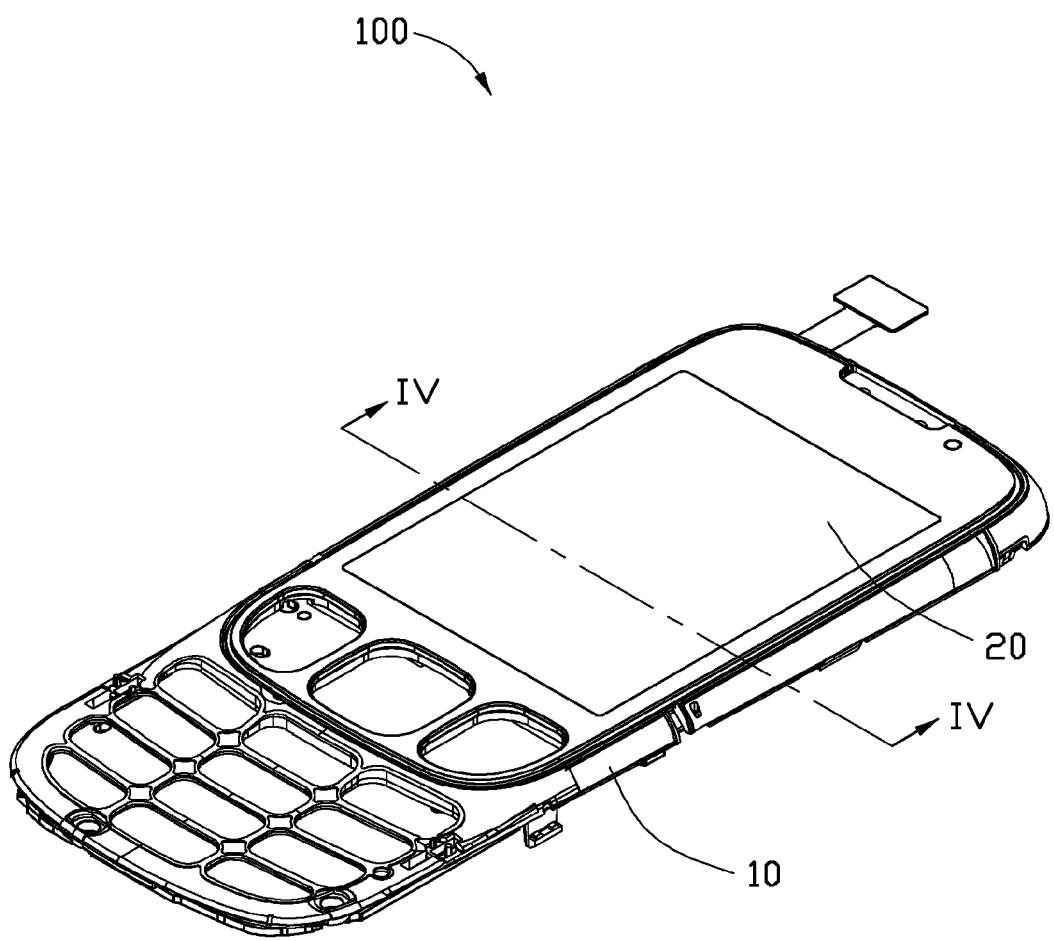
FIG. 3 is an assembled view of the electronic device shown in FIG. 1.
Figure 4:
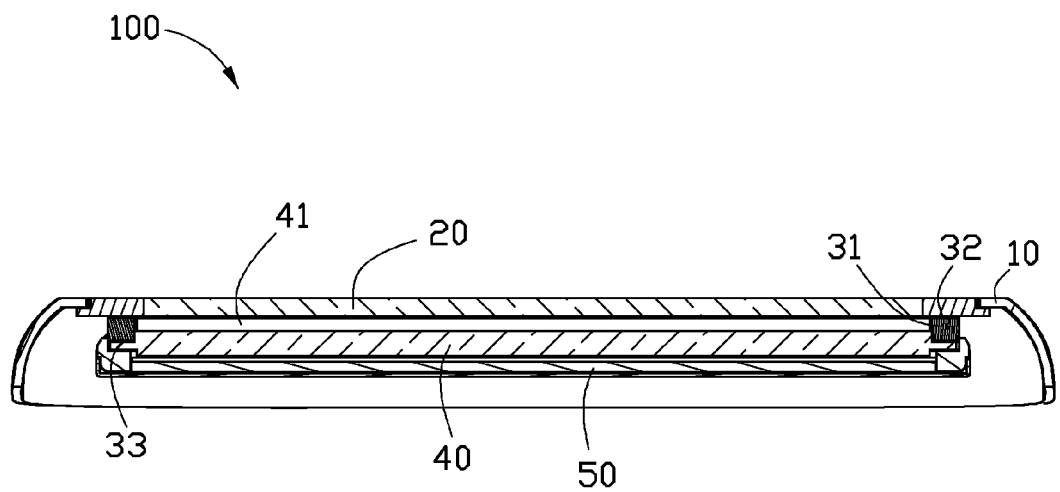
FIG. 4 is an assembled cross-sectional view of the electronic device taken along line IV-IV shown in FIG. 3.

Further referring to FIGS. 3 and 4, in assembly, by coating the contact surface of the protective structure 20 with viscose, adhesive, glue, or other adhesive materials, the protective structure 20 is received and is fixed in the assembling section 111 of the housing 10. The protective structure 20 covers the assembling hole 112, forming the receiving space 122. The dustproof structure 30 is aligned with the receiving space 122 and is fixed and secured to the receiving space 122 through the first adhesive section 32, and the display panel 40 is secured and is fixed on the dustproof structure 30 through the second adhesive section 33. The assembly sections 52 are aligned with the corresponding locking sections 121, and then engage the corresponding locking sections 121 to assemble the circuit board 50 to the housing 10, further securing the display panel 40.

In addition, the display panel 40 is pushed to extrude the dustproof structure 20, and the dustproof section 31 produces deformation and extension to fill the gaps between the first engaging portions 3111 and the second engaging portions 3121. Thus, the dust and other impurities are prevented from entering the housing 10 and the dustproof space 41, further protecting the display panel 40.

The dustproof section 31 is a rectangular frame and is formed by four dustproof strips, which have a simple structure and can reduce cost and improve utilization of the foam. Moreover, the dustproof section 31 can also be rectangular sheet.

In the electronic device 100 employing the exemplary embodiment, the dustproof structure 30 is located and fixed between the housing 10 and the display panel 40. Gaps between the housing 10 and the display panel 40 are substantially filled due to the deformation and extension of the dustproof structure 30 to prevent the dust from entering. Moreover, the dustproof space 41 is formed between the housing 10 and the display panel 40, which can effectively prevent dust and other impurities from affecting the display panel 40.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A dustproof structure used in an electronic device comprising a housing and a display panel, the dustproof structure comprising:
    a dustproof section located and received in the housing, the dustproof section comprising two first dustproof strips and two second dustproof strips, each first dustproof strip comprising two first engaging portions at the opposite ends of the first dustproof strip, each second dustproof strip comprising two second engaging portions at the opposite ends of the second dustproof strip, both the first and second engaging portions being step-shaped, and each first engaging portion of the first dustproof strips engaged to the corresponding second engaging portion of the second dustproof strips; and
    a first adhesive section fixed on one side of the dustproof section, wherein the display panel is fixed on the dustproof structure by the first adhesive section and is assembled to the housing, and the dustproof structure fills gaps between the housing and the display panel.

2. The dustproof structure as claimed in claim 1, further comprising a second adhesive section, wherein the dustproof section is secured and assembled between the first adhesive section and the second adhesive section, and the dustproof structure is secured and fixed to the housing through the second adhesive section to protect the display panel.

3. The dustproof structure as claimed in claim 2, wherein the surfaces of the first adhesive section and the second section are coated with viscose, adhesive, or glue.

4. The dustproof structure as claimed in claim 1, wherein the first dustproof strips are parallel to each other and are perpendicularly connected to the opposite ends of each second dustproof strip.

5. The dustproof structure as claimed in claim 1, wherein the display panel pushes and extrudes the dustproof structure, and the dustproof section produces deformation and extension to fill the gaps between the first engaging portions and the second engaging portions to prevent dust into the housing and protect the display panel.

6. The dustproof structure as claimed in claim 1, wherein the dustproof section is made from foam.

7. An electronic device, comprising:
    a housing;
    a protective structure located on an outer surface of the housing to form a receiving space with the housing;
    a display panel mounted in an inner surface of the housing; and
    a dustproof structure located between the display panel and the housing, the dustproof structure comprising:
        a dustproof section received in the receiving space of the housing, the dustproof section comprising two first dustproof strips and two second dustproof strips, each first dustproof strip comprising two first engaging portions at the opposite ends of the first dustproof strip, each second dustproof strip comprising two second engaging portions at the opposite ends of the second dustproof strip, both the first and second engaging portions being step-shaped, and each first engaging portion of the first dustproof strips engaged to the corresponding second engaging portion of the second dustproof strips; and
        a first adhesive section fixed on one side of the dustproof section and connected the display panel, wherein the display panel is fixed on the dustproof structure by the first adhesive section, the housing and the display panel are assembled together by the dustproof structure, and the dustproof structure fills gaps between the housing and the display panel.

8. The electronic device as claimed in claim 7, wherein the housing comprises a first surface and a second surface relative to the first surface, the first surface comprises an assembling section, and the assembling section defines an assembling hole, the assembling hole is located at the middle of the assembling section and passes through the first surface and the second surface.

9. The electronic device as claimed in claim 8, further comprising a circuit board, wherein the circuit board comprises a base body and a plurality of assembly section at opposite sides of the base body, and the second surface comprises a plurality of locking sections at opposite sides of the second surface, the assembly sections are aligned and engaged with the corresponding locking sections to assemble the circuit board to the housing.

10. The electronic device as claimed in claim 7, wherein the protective structure is made from any of glass and PMMA, and is capable of protecting the display panel, avoiding scratching, tearing and damaging the display panel.

11. The electronic device as claimed in claim 7, wherein the dustproof structure further comprises a second adhesive section, the dustproof section is secured and assembled between the first adhesive section and the second adhesive section, and the dustproof structure is secured and fixed to the receiving space of the housing through the second adhesive section to protect the display panel.

12. The electronic device as claimed in claim 11, wherein the surfaces of the first adhesive section and the second section are coated with viscose, adhesive, or glue.

13. The electronic device as claimed in claim 7, wherein the first dustproof strips are parallel to each other and are perpendicularly connected to the opposite ends of each second dustproof strip.

14. The electronic device as claimed in claim 7, wherein the display panel pushes and extrudes the dustproof structure, and the dustproof section produces deformation and extension to fill the gaps between the first engaging portions and the second engaging portions to prevent dust into the housing and protect the display panel.

15. The electronic device as claimed in claim 7, wherein the dustproof section is made from foam.

\* \* \* \* \*